United States Patent
Jing et al.

(10) Patent No.: US 11,888,878 B2
(45) Date of Patent: Jan. 30, 2024

(54) NETWORK SECURITY

(71) Applicant: Nokia Technologies Oy, Espoo (FI)

(72) Inventors: Xuyang Jing, Xi'an (CN); Zheng Yan, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 742 days.

(21) Appl. No.: 16/971,667

(22) PCT Filed: Feb. 23, 2018

(86) PCT No.: PCT/CN2018/077036
§ 371 (c)(1),
(2) Date: Aug. 20, 2020

(87) PCT Pub. No.: WO2019/161541
PCT Pub. Date: Aug. 29, 2019

(65) Prior Publication Data
US 2020/0412755 A1  Dec. 31, 2020

(51) Int. Cl.
*H04L 9/40* (2022.01)
(52) U.S. Cl.
CPC ...... *H04L 63/1425* (2013.01); *H04L 63/1416* (2013.01); *H04L 63/1441* (2013.01)
(58) Field of Classification Search
CPC ............. H04L 63/1425; H04L 63/1416; H04L 63/1441
(Continued)

(56) References Cited

U.S. PATENT DOCUMENTS 7,751,325 B2   7/2010   Krishnamurthy et al.
8,397,284 B2*  3/2013   Kommareddy ..... H04L 63/1458
                                                726/13
(Continued)

FOREIGN PATENT DOCUMENTS

CN     106576099 A    4/2017
CN     106921666 A    7/2017

OTHER PUBLICATIONS

Rudman et al., "Characterization and Analysis of NTP Amplification Based DDoS Attacks", Information Security for South Africa (ISSA), 2015, 5 pages.
(Continued)

*Primary Examiner* — Badri Narayanan Champakesan
(74) *Attorney, Agent, or Firm* — Capitol Patent & Trademark Law Firm PLLC

(57) ABSTRACT

Various example embodiments relate generally to providing security for a communication network based on detection and mitigation of an attack in the communication network. Various example embodiments supporting attack detection and mitigation may be configured to support detection and mitigation of an attack in a communication network based on distributed collection of network traffic information at network elements and analysis of aggregated network traffic information at a network controller for determining whether a traffic anomaly indicative of an attack on the communication network is detected. Various example embodiments supporting attack detection and mitigation may be configured to support detection and mitigation of an attack in a communication network based on use of traffic records for supporting the collection, aggregation, and analysis of network traffic information.

18 Claims, 7 Drawing Sheets

(58) Field of Classification Search
USPC .......................................................... 726/23
See application file for complete search history.

(56) References Cited

U.S. PATENT DOCUMENTS

| | | | |
|---|---|---|---|
| 9,473,178 B2 | 10/2016 | Shastry et al. | |
| 9,800,592 B2 | 10/2017 | Jain et al. | |
| 10,270,794 B1* | 4/2019 | Mukerji | H04L 63/1458 |
| 10,320,813 B1* | 6/2019 | Ahmed | H04L 63/1416 |
| 10,454,950 B1* | 10/2019 | Aziz | H04L 63/1425 |
| 10,587,647 B1* | 3/2020 | Khalid | H04L 63/1416 |
| 2002/0032774 A1 | 3/2002 | Kohler, Jr. et al. | |
| 2016/0036838 A1* | 2/2016 | Jain | H04L 63/1416 726/23 |
| 2018/0302373 A1* | 10/2018 | Ezell | H04L 67/1036 |
| 2019/0026460 A1* | 1/2019 | Robertson | G06F 21/53 |
| 2019/0207976 A1* | 7/2019 | Yadav | H04L 63/20 |
| 2021/0105251 A1* | 4/2021 | Baldwin | G06F 21/12 |

OTHER PUBLICATIONS

"Bottger et al., DoS Amplification Attacks—Protocol-Agnostic Detection of Service Abuse in Amplifier Networks", International Workshop on Traffic Monitoring and Analysis, 2015, pp. 205-218.
Cai et al., "A Behavior-Based Method for Detecting DNS Amplification Attacks", 10th International Conference on Innovative Mobile and Internet Services in Ubiquitous Computing (IMIS), 2016, pp. 608-613.
Xiao et al., "A Protocol-free Detection Against Cloud Oriented Reflection DoS Attacks", Soft Computing—A Fusion of Foundations, Methodologies and Applications, vol. 21, No. 13, 2016, 9 pages.
Kambourakis et al., "Detecting DNS Amplification Attacks", International Workshop on Critical Information Infrastructures Security, 2007, 12 pages.
Wei et al., "A Rank Correlation Based Detection against Distributed Reflection DoS Attacks", IEEE Communications Letters, vol. 17, No. 1, Jan. 2013, pp. 173-175.
Gao et al., "A Machine Learning Based Approach for Detecting DRDoS Attacks and Its Performance Evaluation", 11th Asia Joint Conference on Information Security, 2016, pp. 80-86.
Liu et al., "A Scalable DDoS Detection Framework with Victim Pinpoint Capability", J. Commun., vol. 6, No. 9, 2011, 11 pages.
Schweller et al., "Reversible Sketches for Efficient and Accurate Change Detection Over Network Data Streams", Proceedings of the 4th ACM SIGCOMM conference on Internet measurement, Oct. 25-27, 2004, pp. 207-212.
International Search Report and Written Opinion received for corresponding Patent Cooperation Treaty Application No. PCT/CN2018/077036, dated Aug. 29, 2018, 10 pages.
Jing et al., "A Reversible Sketch-based Method for Detecting and Mitigating Amplification Attacks", Journal of Network and Computer Applications, vol. 142, 2019, pp. 15-24.
Jing et al., "Network Traffic Fusion and Analysis against DDoS Flooding Attacks with a Novel Reversible Sketch", Information Fusion, vol. 51, 2019, pp. 100-113.
Extended European Search Report received for corresponding European Patent Application No. 18906732.5, dated Sep. 3, 2021, 9 pages.
Salem et al., "A scalable, efficient and informative approach for anomaly-based intrusion detection systems: theory and practice", International Journal of Network Management, vol. 20, No. 5, 2010, pp. 271-293.
Li et al., "HiFIND: A high-speed flow-level intrusion detection approach with DoS resiliency", Computer Networks, vol. 54, No. 8, Jun. 1, 2010, pp. 1282-1299.
Sun et al., "SACK2: effective SYN flood detection against skillful spoofs", IET Information Security, vol. 6, No. 3, 2012, pp. 149-156.
Office action received for corresponding Indian Patent Application No. 202047038723, dated Sep. 7, 2021, 7 pages.
Office action received for corresponding Chinese Patent Application No. 201880092634.0, dated Mar. 16, 2022, 14 pages of office action and no page of translation available.

* cited by examiner

NETWORK SECURITY

RELATED APPLICATION

This application claims priority to PCT Application No. PCT/CN2018/077036, filed on Feb. 23, 2018, of which is incorporated herein by reference in its entirety.

TECHNICAL FIELD

Various example embodiments relate generally to communication networks and, more particularly but not exclusively, to network security for communication networks.

BACKGROUND

Communication networks may be subject to various kinds of attacks from malicious entities.

SUMMARY

Various example embodiments relate generally to providing security for communication networks.

In at least some example embodiments, an apparatus is provided. The apparatus includes at least one processor. The apparatus includes at least one memory including computer program code. The at least one memory and the computer program code are configured to, with the at least one processor, cause the apparatus to at least monitor traffic, at an edge device of a communication network, for request packets and response packets, generate a first traffic record indicative of respective measures of request packets exiting the communication network via the edge device for respective data flows and a second traffic record indicative of respective measures of response packets entering the communication network via the edge device for respective data flows, and send the first traffic record and the second traffic record from the edge device toward a controller. In at least some embodiments, the traffic is monitored at the edge device using flow-level monitoring. In at least some embodiments, the first traffic record includes a first reversible sketch and the second traffic record includes a second reversible sketch. In at least some embodiments, the first traffic record is keyed based on destination address information and the second traffic record is keyed based on source address information. In at least some embodiments, the respective measures of request packets sent by the edge device for the respective data flows and the respective measures of response packets received by the edge device for the respective data flows include flow size information. In at least some embodiments, the at least one memory and the computer program code are configured to, with the at least one processor, cause the apparatus to at least receive, from the controller, an instruction to control traffic of one of the data flows identified as having a traffic anomaly associated therewith and control the traffic of the one of the data flows identified as having the traffic anomaly associated therewith. In at least some embodiments, the at least one memory and the computer program code are configured to, with the at least one processor, cause the apparatus to at least receive, from the controller, an instruction to stop controlling traffic of the one of the data flows identified as having the traffic anomaly associated therewith and stop controlling the traffic of the one of the data flows identified as having the traffic anomaly associated therewith. In at least some embodiments, the edge device is an edge router of the communication network.

In at least some example embodiments, a method is provided. The method includes monitoring traffic, at an edge device of a communication network, for request packets and response packets, generate a first traffic record indicative of respective measures of request packets exiting the communication network via the edge device for respective data flows and a second traffic record indicative of respective measures of response packets entering the communication network via the edge device for respective data flows. The method includes sending the first traffic record and the second traffic record from the edge device toward a controller. In at least some embodiments, the traffic is monitored at the edge device using flow-level monitoring. In at least some embodiments, the first traffic record includes a first reversible sketch and the second traffic record includes a second reversible sketch. In at least some embodiments, the first traffic record is keyed based on destination address information and the second traffic record is keyed based on source address information. In at least some embodiments, the respective measures of request packets sent by the edge device for the respective data flows and the respective measures of response packets received by the edge device for the respective data flows include flow size information. In at least some embodiments, the method includes receiving, from the controller, an instruction to control traffic of one of the data flows identified as having a traffic anomaly associated therewith and controlling the traffic of the one of the data flows identified as having the traffic anomaly associated therewith. In at least some embodiments, the method includes receiving, from the controller, an instruction to stop controlling traffic of the one of the data flows identified as having the traffic anomaly associated therewith and stopping control of the traffic of the one of the data flows identified as having the traffic anomaly associated therewith. In at least some embodiments, the edge device is an edge router of the communication network.

In at least some example embodiments, a non-transitory computer readable medium is provided. The non-transitory computer-readable medium includes program instructions for causing an apparatus to at least monitor traffic, at an edge device of a communication network, for request packets and response packets, generate a first traffic record indicative of respective measures of request packets exiting the communication network via the edge device for respective data flows and a second traffic record indicative of respective measures of response packets entering the communication network via the edge device for respective data flows, and send the first traffic record and the second traffic record from the edge device toward a controller. In at least some embodiments, the traffic is monitored at the edge device using flow-level monitoring. In at least some embodiments, the first traffic record includes a first reversible sketch and the second traffic record includes a second reversible sketch. In at least some embodiments, the first traffic record is keyed based on destination address information and the second traffic record is keyed based on source address information. In at least some embodiments, the respective measures of request packets sent by the edge device for the respective data flows and the respective measures of response packets received by the edge device for the respective data flows include flow size information. In at least some embodiments, the non-transitory computer-readable medium includes program instructions for causing the apparatus to at least receive, from the controller, an instruction to control traffic of one of the data flows identified as having a traffic anomaly associated therewith and control the traffic of the one of the data flows identified as having the traffic anomaly associated therewith. In at least some embodiments, the non-transitory computer-readable medium includes program instructions for causing the apparatus to at least receive, from the controller, an instruction to stop controlling traffic of the one of the data flows identified as having the traffic anomaly associated therewith and stop controlling the traffic of the one of the data flows identified as having the traffic anomaly associated therewith. In at least some embodiments, the edge device is an edge router of the communication network.

In at least some example embodiments, an apparatus is provided. The apparatus includes means for monitoring traffic, at an edge device of a communication network, for request packets and response packets, generate a first traffic record indicative of respective measures of request packets exiting the communication network via the edge device for respective data flows and a second traffic record indicative of respective measures of response packets entering the communication network via the edge device for respective data flows. The apparatus includes means for sending the first traffic record and the second traffic record from the edge device toward a controller. In at least some embodiments, the traffic is monitored at the edge device using flow-level monitoring. In at least some embodiments, the first traffic record includes a first reversible sketch and the second traffic record includes a second reversible sketch. In at least some embodiments, the first traffic record is keyed based on destination address information and the second traffic record is keyed based on source address information. In at least some embodiments, the respective measures of request packets sent by the edge device for the respective data flows and the respective measures of response packets received by the edge device for the respective data flows include flow size information. In at least some embodiments, the apparatus includes means for receiving, from the controller, an instruction to control traffic of one of the data flows identified as having a traffic anomaly associated therewith and means for controlling the traffic of the one of the data flows identified as having the traffic anomaly associated therewith. In at least some embodiments, the apparatus includes means for receiving, from the controller, an instruction to stop controlling traffic of the one of the data flows identified as having the traffic anomaly associated therewith and means for stopping control of the traffic of the one of the data flows identified as having the traffic anomaly associated therewith. In at least some embodiments, the edge device is an edge router of the communication network.

In at least some example embodiments, an apparatus is provided. The apparatus includes at least one processor. The apparatus includes at least one memory including computer program code. The at least one memory and the computer program code are configured to, with the at least one processor, cause the apparatus to at least receive, from each edge device in a set of edge devices of a communication network, a respective set of network traffic information including a first traffic record indicative of respective measures of request packets exiting the communication network via the respective edge device for respective data flows and a second traffic record indicative of respective measures of response packets entering the communication network via the respective edge device for respective data flows and determine, based on the sets of network traffic information of the edge devices, whether a traffic anomaly indicative of an attack on the communication network is detected. In at least some embodiments, for at least one of the edge devices, the first traffic record includes a first reversible sketch and the second traffic record includes a second reversible sketch. In at least some embodiments, the first traffic record is keyed based on destination address information and the second traffic record is keyed based on source address information. In at least some embodiments, the respective measures of request packets sent by the edge device for the respective data flows and the respective measures of response packets received by the edge device for the respective data flows include flow size information. In at least some embodiments, to determine whether a traffic anomaly indicative of an attack on the communication network is detected, the at least one memory and the computer program code are configured to, with the at least one processor, cause the apparatus to at least aggregate the first traffic records of the edge devices and the second traffic records of the edge devices to form thereby an aggregated traffic record and determine, based on the aggregated traffic record, whether a traffic anomaly indicative of an attack on the communication network is detected. In at least some embodiments, to aggregate the first traffic records of the edge devices and the second traffic records of the edge devices to form the aggregated traffic record, the at least one memory and the computer program code are configured to, with the at least one processor, cause the apparatus to at least aggregate the first traffic records of the edge devices and the second traffic records of the edge devices in a manner for cancelling the respective measures of request packets exiting the communication network via the respective edge device for respective data flows and the respective measures of response packets entering the communication network via the respective edge device for respective data flows. In at least some embodiments, to aggregate the first traffic records of the edge devices and the second traffic records of the edge devices to form the aggregated traffic record, the at least one memory and the computer program code are configured to, with the at least one processor, cause the apparatus to at least apply a first set of weights to values of the first traffic records of the edge devices to provide respective weighted first traffic records, apply a second set of weights to values of the second traffic records of the edge devices to provide respective weighted second traffic records, and aggregate the weighted first traffic records of the edge devices and the weighted second traffic records of the edge devices to form thereby the aggregated traffic record. In at least some embodiments, to determine whether a traffic anomaly indicative of an attack on the communication network is detected based on the aggregated traffic record, the at least one memory and the computer program code are configured to, with the at least one processor, cause the apparatus to at least determine, for each of a plurality of keys of the aggregated traffic record, whether a value associated with the respective key satisfies a threshold. In at least some embodiments, to determine whether a traffic anomaly indicative of an attack on the communication network is detected based on the aggregated traffic record, the at least one memory and the computer program code are configured to, with the at least one processor, cause the apparatus to at least generate, based on the aggregated traffic record, a list of anomalous keys including keys of the aggregated traffic record for which respective values satisfy a threshold and determine, from the list of anomalous keys, whether any of the anomalous keys are included in the list of anomalous keys at least a threshold number of times. In at least some embodiments, the at least one memory and the computer program code are configured to, with the at least one processor, cause the apparatus to at least initiate, in response to a determination that a traffic anomaly indicative of an attack on the communication network is detected for a data flow, attack mitigation for the data flow. In at least some embodiments, to initiate attack mitigation for the data flow, the at least one memory and the computer program code are configured to, with the at least one processor, cause the apparatus to at least determine, based on the aggregated traffic record, an identity of a reflector associated with the traffic anomaly indicative of the attack on the communication network and initiate attack mitigation for the data flow based on the identity of the reflector associated with the traffic anomaly indicative of the attack on the communication network. In at least some embodiments, to initiate attack mitigation for the data flow, the at least one memory and the computer program code are configured to, with the at least one processor, cause the apparatus to at least send, toward one of the edge devices, an instruction for the one of the edge devices to control traffic of the data flow. In at least some embodiments, the at least one memory and the computer program code are configured to, with the at least one processor, cause the apparatus to at least determine, based on new sets of network traffic information of the edge devices, that the data flow no longer has the traffic anomaly indicative of the attack on the communication network associated therewith and initiate, in response to the determination that the data flow no longer has the traffic anomaly indicative of the attack on the communication network associated therewith, removal of attack mitigation for the data flow.

In at least some example embodiments, a method is provided. The method includes receiving, from each edge device in a set of edge devices of a communication network, a respective set of network traffic information including a first traffic record indicative of respective measures of request packets exiting the communication network via the respective edge device for respective data flows and a second traffic record indicative of respective measures of response packets entering the communication network via the respective edge device for respective data flows. The method includes determining, based on the sets of network traffic information of the edge devices, whether a traffic anomaly indicative of an attack on the communication network is detected. In at least some embodiments, for at least one of the edge devices, the first traffic record includes a first reversible sketch and the second traffic record includes a second reversible sketch. In at least some embodiments, the first traffic record is keyed based on destination address information and the second traffic record is keyed based on source address information. In at least some embodiments, the respective measures of request packets sent by the edge device for the respective data flows and the respective measures of response packets received by the edge device for the respective data flows include flow size information. In at least some embodiments determining whether a traffic anomaly indicative of an attack on the communication network is detected includes aggregating the first traffic records of the edge devices and the second traffic records of the edge devices to form thereby an aggregated traffic record and determining, based on the aggregated traffic record, whether a traffic anomaly indicative of an attack on the communication network is detected. In at least some embodiments, aggregating the first traffic records of the edge devices and the second traffic records of the edge devices to form the aggregated traffic record includes aggregating the first traffic records of the edge devices and the second traffic records of the edge devices in a manner for cancelling the respective measures of request packets exiting the communication network via the respective edge device for respective data flows and the respective measures of response packets entering the communication network via the respective edge device for respective data flows. In at least some embodiments, aggregating the first traffic records of the edge devices and the second traffic records of the edge devices to form the aggregated traffic record includes applying a first set of weights to values of the first traffic records of the edge devices to provide respective weighted first traffic records, applying a second set of weights to values of the second traffic records of the edge devices to provide respective weighted second traffic records, and aggregating the weighted first traffic records of the edge devices and the weighted second traffic records of the edge devices to form thereby the aggregated traffic record. In at least some embodiments, determining whether a traffic anomaly indicative of an attack on the communication network is detected based on the aggregated traffic record includes determining, for each of a plurality of keys of the aggregated traffic record, whether a value associated with the respective key satisfies a threshold. In at least some embodiments, determining whether a traffic anomaly indicative of an attack on the communication network is detected based on the aggregated traffic record includes generating, based on the aggregated traffic record, a list of anomalous keys including keys of the aggregated traffic record for which respective values satisfy a threshold and determining, from the list of anomalous keys, whether any of the anomalous keys are included in the list of anomalous keys at least a threshold number of times. In at least some embodiments, the method includes initiating, in response to a determination that a traffic anomaly indicative of an attack on the communication network is detected for a data flow, attack mitigation for the data flow. In at least some embodiments, initiating attack mitigation for the data flow includes determining, based on the aggregated traffic record, an identity of a reflector associated with the traffic anomaly indicative of the attack on the communication network and initiating attack mitigation for the data flow based on the identity of the reflector associated with the traffic anomaly indicative of the attack on the communication network. In at least some embodiments, initiating attack mitigation for the data flow includes sending, toward one of the edge devices, an instruction for the one of the edge devices to control traffic of the data flow. In at least some embodiments, the method includes determining, based on new sets of network traffic information of the edge devices, that the data flow no longer has the traffic anomaly indicative of the attack on the communication network associated therewith and initiating, in response to the determination that the data flow no longer has the traffic anomaly indicative of the attack on the communication network associated therewith, removal of attack mitigation for the data flow.

In at least some example embodiments, a non-transitory computer readable medium is provided. The non-transitory computer-readable medium includes program instructions for causing an apparatus to at least receive, from each edge device in a set of edge devices of a communication network, a respective set of network traffic information including a first traffic record indicative of respective measures of request packets exiting the communication network via the respective edge device for respective data flows and a second traffic record indicative of respective measures of response packets entering the communication network via the respective edge device for respective data flows and determine, based on the sets of network traffic information of the edge devices, whether a traffic anomaly indicative of an attack on the communication network is detected. In at least some embodiments, for at least one of the edge devices, the first traffic record includes a first reversible sketch and the second traffic record includes a second reversible sketch.

In at least some embodiments, the first traffic record is keyed based on destination address information and the second traffic record is keyed based on source address information. In at least some embodiments, the respective measures of request packets sent by the edge device for the respective data flows and the respective measures of response packets received by the edge device for the respective data flows include flow size information. In at least some embodiments, to determine whether a traffic anomaly indicative of an attack on the communication network is detected, the non-transitory computer-readable medium includes program instructions for causing the apparatus to at least aggregate the first traffic records of the edge devices and the second traffic records of the edge devices to form thereby an aggregated traffic record and determine, based on the aggregated traffic record, whether a traffic anomaly indicative of an attack on the communication network is detected. In at least some embodiments, to aggregate the first traffic records of the edge devices and the second traffic records of the edge devices to form the aggregated traffic record, the non-transitory computer-readable medium includes program instructions for causing the apparatus to at least aggregate the first traffic records of the edge devices and the second traffic records of the edge devices in a manner for cancelling the respective measures of request packets exiting the communication network via the respective edge device for respective data flows and the respective measures of response packets entering the communication network via the respective edge device for respective data flows. In at least some embodiments, to aggregate the first traffic records of the edge devices and the second traffic records of the edge devices to form the aggregated traffic record, the non-transitory computer-readable medium includes program instructions for causing the apparatus to at least apply a first set of weights to values of the first traffic records of the edge devices to provide respective weighted first traffic records, apply a second set of weights to values of the second traffic records of the edge devices to provide respective weighted second traffic records, and aggregate the weighted first traffic records of the edge devices and the weighted second traffic records of the edge devices to form thereby the aggregated traffic record. In at least some embodiments, to determine whether a traffic anomaly indicative of an attack on the communication network is detected based on the aggregated traffic record, the non-transitory computer-readable medium includes program instructions for causing the apparatus to at least determine, for each of a plurality of keys of the aggregated traffic record, whether a value associated with the respective key satisfies a threshold. In at least some embodiments, to determine whether a traffic anomaly indicative of an attack on the communication network is detected based on the aggregated traffic record, the non-transitory computer-readable medium includes program instructions for causing the apparatus to at least generate, based on the aggregated traffic record, a list of anomalous keys including keys of the aggregated traffic record for which respective values satisfy a threshold and determine, from the list of anomalous keys, whether any of the anomalous keys are included in the list of anomalous keys at least a threshold number of times. In at least some embodiments, the non-transitory computer-readable medium includes program instructions for causing the apparatus to at least initiate, in response to a determination that a traffic anomaly indicative of an attack on the communication network is detected for a data flow, attack mitigation for the data flow. In at least some embodiments, to initiate attack mitigation for the data flow, the non-transitory computer-readable medium includes program instructions for causing the apparatus to at least determine, based on the aggregated traffic record, an identity of a reflector associated with the traffic anomaly indicative of the attack on the communication network and initiate attack mitigation for the data flow based on the identity of the reflector associated with the traffic anomaly indicative of the attack on the communication network. In at least some embodiments, to initiate attack mitigation for the data flow, the non-transitory computer-readable medium includes program instructions for causing the apparatus to at least send, toward one of the edge devices, an instruction for the one of the edge devices to control traffic of the data flow. In at least some embodiments, the non-transitory computer-readable medium includes program instructions for causing the apparatus to at least determine, based on new sets of network traffic information of the edge devices, that the data flow no longer has the traffic anomaly indicative of the attack on the communication network associated therewith and initiate, in response to the determination that the data flow no longer has the traffic anomaly indicative of the attack on the communication network associated therewith, removal of attack mitigation for the data flow.

In at least some example embodiments, an apparatus is provided. The apparatus includes means for receiving, from each edge device in a set of edge devices of a communication network, a respective set of network traffic information including a first traffic record indicative of respective measures of request packets exiting the communication network via the respective edge device for respective data flows and a second traffic record indicative of respective measures of response packets entering the communication network via the respective edge device for respective data flows. The apparatus includes means for determining, based on the sets of network traffic information of the edge devices, whether a traffic anomaly indicative of an attack on the communication network is detected. In at least some embodiments, for at least one of the edge devices, the first traffic record includes a first reversible sketch and the second traffic record includes a second reversible sketch. In at least some embodiments, the first traffic record is keyed based on destination address information and the second traffic record is keyed based on source address information. In at least some embodiments, the respective measures of request packets sent by the edge device for the respective data flows and the respective measures of response packets received by the edge device for the respective data flows include flow size information. In at least some embodiments, the means for determining whether a traffic anomaly indicative of an attack on the communication network is detected includes means for aggregating the first traffic records of the edge devices and the second traffic records of the edge devices to form thereby an aggregated traffic record and means for determining, based on the aggregated traffic record, whether a traffic anomaly indicative of an attack on the communication network is detected. In at least some embodiments, the means for aggregating the first traffic records of the edge devices and the second traffic records of the edge devices to form the aggregated traffic record includes means for aggregating the first traffic records of the edge devices and the second traffic records of the edge devices in a manner for cancelling the respective measures of request packets exiting the communication network via the respective edge device for respective data flows and the respective measures of response packets entering the communication network via the respective edge device for respective data flows. In at least some embodiments, the means for aggregating the first traffic records of the edge devices and the second traffic records of the edge devices to form the aggregated traffic record includes means for applying a first set of weights to values of the first traffic records of the edge devices to provide respective weighted first traffic records, means for applying a second set of weights to values of the second traffic records of the edge devices to provide respective weighted second traffic records, and means for aggregating the weighted first traffic records of the edge devices and the weighted second traffic records of the edge devices to form thereby the aggregated traffic record. In at least some embodiments, the means for determining whether a traffic anomaly indicative of an attack on the communication network is detected based on the aggregated traffic record includes means for determining, for each of a plurality of keys of the aggregated traffic record, whether a value associated with the respective key satisfies a threshold. In at least some embodiments, the means for determining whether a traffic anomaly indicative of an attack on the communication network is detected based on the aggregated traffic record includes means for generating, based on the aggregated traffic record, a list of anomalous keys including keys of the aggregated traffic record for which respective values satisfy a threshold and means for determining, from the list of anomalous keys, whether any of the anomalous keys are included in the list of anomalous keys at least a threshold number of times. In at least some embodiments, the apparatus includes means for initiating, in response to a determination that a traffic anomaly indicative of an attack on the communication network is detected for a data flow, attack mitigation for the data flow. In at least some embodiments, the means for initiating attack mitigation for the data flow includes means for determining, based on the aggregated traffic record, an identity of a reflector associated with the traffic anomaly indicative of the attack on the communication network and means for initiating attack mitigation for the data flow based on the identity of the reflector associated with the traffic anomaly indicative of the attack on the communication network. In at least some embodiments, the means for initiating attack mitigation for the data flow includes means for sending, toward one of the edge devices, an instruction for the one of the edge devices to control traffic of the data flow. In at least some embodiments, the apparatus includes means for determining, based on new sets of network traffic information of the edge devices, that the data flow no longer has the traffic anomaly indicative of the attack on the communication network associated therewith and means for initiating, in response to the determination that the data flow no longer has the traffic anomaly indicative of the attack on the communication network associated therewith, removal of attack mitigation for the data flow.

BRIEF DESCRIPTION OF DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
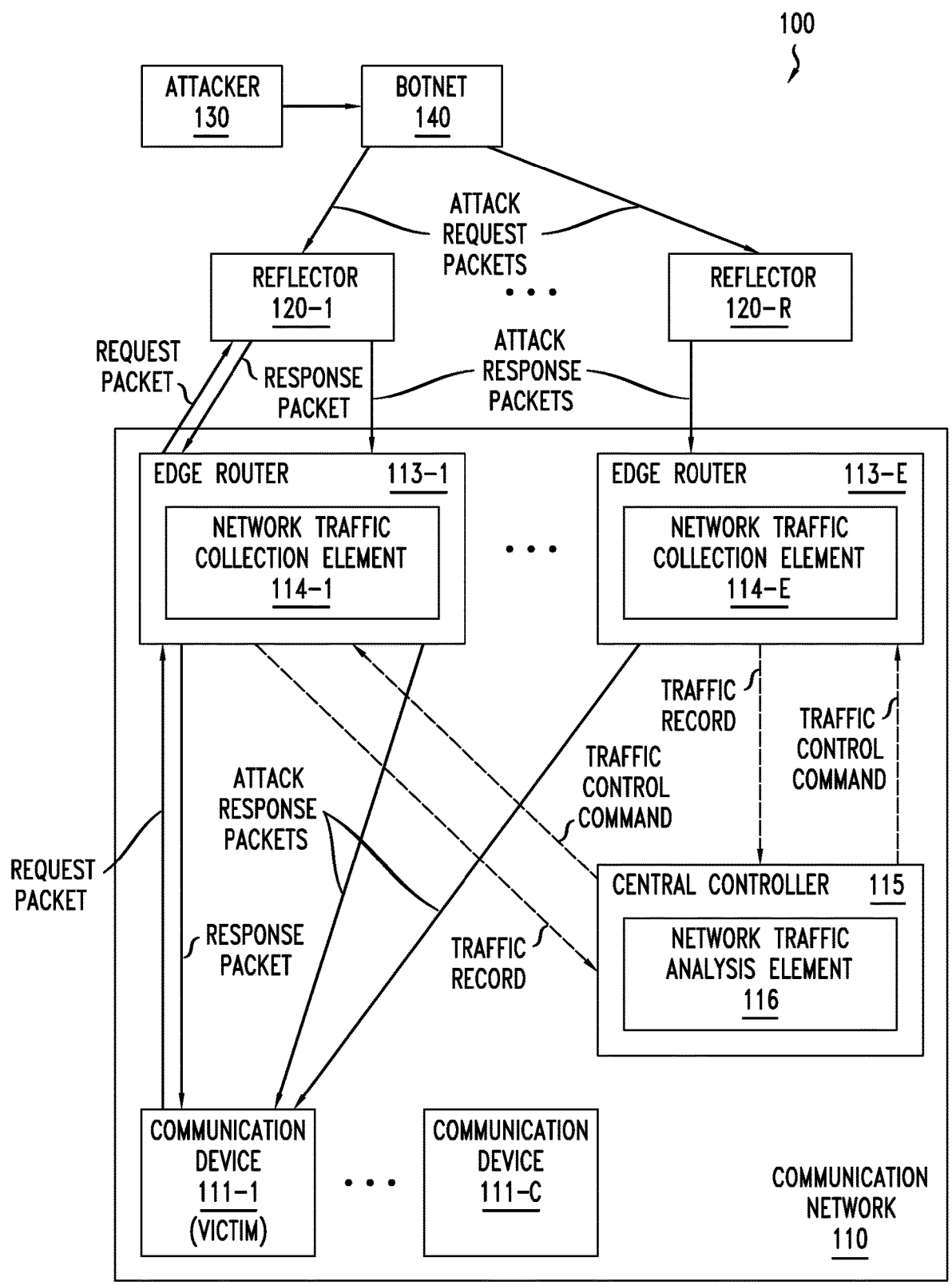
FIG. 1 depicts an example communication system including a communication network configured to support detection and mitigation of an attack.

Various example embodiments relate generally to providing security for communication networks. Various example embodiments relate generally to providing security for a communication network based on detection and mitigation of an attack in the communication network. Various example embodiments supporting attack detection and mitigation may be configured to support detection and mitigation of an attack in a communication network based on the one-to-one mapping relationship between request packets and response packets supported by many protocols used by attackers to initiate attacks (e.g., various protocols of the Transmission Control Protocol (TCP)/Internet Protocol IP) model, such as a Transmission Control Protocol (TCP), a User Datagram Protocol (UDP), a Domain Name System (DNS) protocol, a Network Time Protocol (NTP), a Trivial File Transfer Protocol (TFTP), or a Simple Network Management Protocol (SNMP), an Internet Control Message Protocol (ICMP), or the like). Various example embodiments supporting attack detection and mitigation may be configured to support detection and mitigation of an attack in a communication network based on distributed collection of network traffic information at network elements and analysis of aggregated network traffic information at a network controller. Various example embodiments supporting attack detection and mitigation may be configured to support detection and mitigation of an attack in a communication network based on use of network traffic data structures configured to support the collection, aggregation, and analysis of network traffic information (e.g., reversible sketches or other types of data structures configured to support collection, aggregation, and analysis of network traffic information as discussed herein). Various example embodiments supporting attack detection and mitigation, by combining one-to-one mapping detection techniques with use of configured to return identification information associated with devices exhibiting anomalous behavior, is able to support accurate and efficient detection and mitigation of attacks in communication networks. Various example embodiments supporting attack detection and mitigation may be configured to support detection and mitigation of attacks in a communication network in a protocol-independent manner (e.g., for various protocols which may be used to initiate attacks which, as indicated above, may include TCP, UDP, DNS, NTP, TFTP, SNMP, ICMP, or the like), in the presence of large-scale network traffic, in high-speed data networks, or the like, as well as various combinations thereof. Various example embodiments supporting attack detection and mitigation may be configured to support detection and mitigation of various types of attacks, such as amplification attacks or other types of attacks. It will be appreciated that these and various other embodiments and advantages and potential advantages of attack detection and mitigation may be further understood by way of reference to the example communication system of FIG. 1.

FIG. 1 depicts an example communication system configured to support detection and mitigation of an attack in a communication network.

The communication system 100 includes a communication network 110, a set of reflectors 120-1-120-R (collectively, reflectors 120), an attacker 130, and a botnet 140.

The communication network 110 includes a set of communication devices 111-1-111-C (collectively, communication devices 111), a set of edge routers 113-1-113-E (collectively, edge routers 113), and a central controller 115). It will be appreciated that the communication network 110 also may include various other elements (e.g., devices, subnets, or the like).

The communication devices 111 may include any communication devices which may be located with the communication network 110. The device types of the communication devices 111 may depend on the network type of the communication network 110.

The edge routers 113 may be configured to support communications of the communication network 110, operating as ingress points into the communication network 110 and as egress points out of the communication network 110. The edge routers 113 may be configured to support communications by elements within the communication network 110 with elements outside of the communication network 110, by elements outside of the communication network 110 with elements within the communication network 110, or the like, as well as various combinations thereof.

The central controller 115 is configured to provide various control functions for the communication network 110. The central controller 115 may be configured to support control functions for controlling edge routers 113 (e.g., configuration of edge routers (e.g., installing and removing routes, installing and removing traffic control rules (e.g., traffic filtering rules, traffic blocking rules, or the like), or the like)).

The reflectors 120 are servers that may be configured to provide various functions based on use of request/response transactions. For example, the reflectors 120 may include DNS servers, NTP servers, TFTP servers, servers providing TCP-based service, or the like.

It will be appreciated that, although primarily presented with respect to a specific configuration of communication network 110 (e.g., specific types, numbers, and arrangements of elements of communication network 110), the communication network 110 may be configured in various other ways (e.g., including various other types, numbers, or arrangements of the elements).

The communication network 110 supports typical communications of the communication devices 111. The communication devices 111 may send request packets to the reflectors 120 and receive associated response packets from the reflectors 120. It is noted that examples of such legitimate request and response packets are depicted in FIG. 1 for one of the communication devices 111 (illustratively, communication device 111-1 sends a request packet to reflector 120-1 via edge router 113-1 and receives an associate response packet from reflector 120-1 via edge router 113-1). It will be appreciated that any of the communication devices 111 may send any suitable numbers and types request packets to any reflectors 120 (or other devices or servers) and similarly, may receive the respective response packets from the reflectors 120 (or other devices or servers). These request and response packets may be based on various protocols of the TCP/IP model that support a request-response relationship (e.g., TCP, UDP, DNS, NTP, TFTP, SNMP, ICMP, or the like). It is noted that examples of specific request-response packets which may be used by communication devices 111 and reflectors 120 for legitimate purposes are presented below in Table 1. These request and response packets traverse the edge routers 113.

TABLE 1

| REQUEST PACKETS | RESPONSE PACKETS |
| --- | --- |
| TCP SYN PACKETS TO OPEN TCP PORTS | TCP SYN/ACK PACKETS |
| DNS QUERY PACKETS | DNS REPLY PACKETS |
| NTP MONLIST REQUEST PACKETS | NTP MONLIST RESPONSE PACKETS |
| SNMP REQUEST PACKETS | SNMP RESPONSE PACKETS |
| TFTP REQUEST PACKETS | TFTP RESPONSE PACKETS |
| ICMP REQUEST PACKETS | ICMP REPLY PACKETS |
| UDP PACKETS TO CLOSE TCP PORTS | ICMP PORT UNREACHED PACKETS |
| TCP PACKETS TO CLOSE TCP PORTS | TCP RST PACKETS |

The communication network 110, however, may be subject to various types of attacks. For example, distributed Denial of Service (DDoS) flooding attacks are very prevalent over the Internet. DDoS flooding attacks aim to prevent normal users from accessing specific network resources. DDoS flooding attacks can be generated in two ways: direct flooding attacks and indirect flooding attacks. In direct DDoS flooding attacks, such as network/transport layer DDoS flooding attacks and application layer DDoS flooding attacks, attackers typically spoof the source IP address of attack packets and send the attack packets to the victims directly. In indirect DDoS flooding attacks, such as Distributed Reflection DoS (DRDoS) attacks and link flooding attacks, attackers use many innocent intermediates to flood victims indirectly. Among these various types of attacks, DRDoS attacks have gained popularity and have become serious threats to the Internet due to their characteristics of anonymity and amplification. In DRDoS flooding attacks, an attacker (such as attacker 130) typically commands a botnet (such as the botnet 140) to send a large number of relatively large spoofed request packets (having a spoofed source address, which is the address of the victim) to reflectors (such as reflectors 120) in order to trigger a relatively large number of relatively large response packets to be sent by the reflectors to a victim (illustratively, communication device 111-1 is the victim in FIG. 1), thereby causing system resources of the victim to be consumed. It is noted that examples of such attack request and response packets are depicted in FIG. 1 for one of the communication devices 111 (illustratively, communication device 111-1 which, as indicated above, is the victim in FIG. 1), where attacker 130 causes botnet 140 to send attack request packets to each of the reflectors 120, which in turn causes each of the reflectors 120 to send corresponding response packets to the communication device 111-1 via the edge routers 113. The attacker typically uses a protocol of the TCP/IP model that supports a request-response relationship (e.g., TCP, UDP, DNS, NTP, TFTP, SNMP, ICMP, or the like). It is noted that examples of specific request-response packets which may be used to initiate an attack are presented above in Table 1. Typically, the number/size of response packets is many times larger than the number/size of request packets, so this type of DRDoS flooding attack is often referred to as a reflection amplification DDoS flooding attack (typically referred to more generally as an amplification attack). The impact of an amplification attacks is typically measured by two amplification factors: (1) Packet Amplification Factor (PAF), which is the ratio of the number of response packets to the number of request packets and (2) Bandwidth Amplification Factor (BAF), which is the ratio of the payload size of response packets to the payload size of request packets. Attackers are trending toward use of such amplification attacks at least for these two reasons: (i) anonymity: an attacker can hide its location by using a spoofed source IP address and (ii) amplification: an attacker can amplify the impact of attacks by exploiting bots for increasing both the number and size of spoofed request packets and unsymmetrical size of response packets. As such, amplification attacks have distinct characteristics that make them particularly serious threats to network security.

The communication network 110 of FIG. 1 is configured to support detection and mitigation of attacks (e.g., amplification attacks, as discussed above, or other types of attacks). The communication network 110 of FIG. 1 may be configured to support detection and mitigation of attacks by exploiting basic attack characteristics of amplification attacks (e.g., the one-to-one relationship between request packets and response packets in the absence of an amplification attack and the unbalanced relationship between request packets and response packets during an amplification attack) to perform attack detection. The communication network 110 of FIG. 1 may be configured to support detection and mitigation of attacks by exploiting the attack characteristics of amplification attacks based on use of network traffic data structures configured to support collection, aggregation, and analysis of network traffic information in a manner enabling identification of devices exhibiting anomalous behavior. The network traffic data structures may be reversible sketches (which, generally speaking, are compact, constant-size data structures configured to summarize network traffic by using hash functions to randomly aggregate traffic and to support identification of keys exhibiting anomalous behavior by reversely recovering the keys associated with anomalous traffic) or other types of data structures configured to support collection, aggregation, and analysis of network traffic information in a manner enabling identification of devices associated with traffic exhibiting anomalous behavior. Various example embodiments are primarily discussed herein within the context of embodiments in which the traffic records used for attack detection and mitigation are reversible sketches; however, as noted above, the traffic records used for attack detection and mitigation may be based on other types of data structures.

The communication network 110, as discussed above, may be configured to perform attack detection and mitigation based on use of reversible sketches. In general, a sketch is a data structure that is composed of H hash tables of size M. In general, a sketch, models network traffic as a stream of (key, value) pairs, where the key can be one or more fields in packet headers of packets of the traffic and the value represents an accumulative feature of the packets (e.g., the number of packets, packet size, or the like). In the sketch, each bucket is represented as $T[i][j]$, $i=(1, 2, \ldots, H)$, $j=(1, 2, \ldots, M)$, and each row i is associated with an independent hash function $h_i$ that maps the incoming keys into a hashing space of $(1, 2, \ldots, M)$. The hashed outputs are associated with their corresponding columns. For example, when a new pairwise item (key, value) arrives, the key will be hashed H times by $\{h_1, h_2, h_H\}$ and the value will be added to the corresponding bucket in each column, namely $T[i][h_i(key)] = T[i][h_i(key)] + value$, $i=(1, 2, \ldots, H)$. The purpose of applying H hash functions is to avoid the collisions between different keys. The probability that two keys are hashed in the same value is bounded if the function is selected from a kind of hash family. Typically, H hash functions in a sketch are chosen from the family of k-universal hash functions as defined in the following equation: $h(x) = \sum_{i=0}^{k-1} (a_i x^i + b_i) \bmod p \bmod M$, where p is an arbitrary prime (e.g., Mersenne prime numbers may be chosen for fast implementation, although it will be appreciated that other prime numbers may be used), $a_i$ ($\neq 0$) and $b_i$ are randomly selected from the set of $(0, 1, \ldots, p-1)$, and M is the width of sketch. Using k-universal hash functions, the probability that two keys are aggregated in the same bucket over H hash tables is $(1/M)^{k*H}$. This type of sketch can be used to detect anomalies by monitoring the variation of the value in each bucket (e.g., whether the number of packets is larger than a given threshold, whether the amount of packet data is larger than a given threshold, or the like); however, this type of sketch cannot report the keys that are exhibiting the anomalies. In other words, such a sketch, which may be referred to as a traditional sketch so as to distinguish it from a reversible sketch, is not reversible. By contrast, a reversible sketch is configured to detect anomalies by monitoring the variation of the value in each bucket (e.g., whether the number of packets is larger than a given threshold, whether the amount of packet data is larger than a given threshold, or the like) and to identify the keys that are exhibiting the anomalies. A reversible sketch may use modular hashing and IP mangling technologies in order to modify the input keys and hash functions such that it becomes possible to recover the keys that exhibit anomalous behavior. In general, a reversible sketch supports a number of basic functions, including an UPDATE function that is configured to update a reversible sketch when new traffic arrives, a COMBINE function that is configured to linearly combine multiple reversible sketches into a single combined reversible sketch (e.g., using bucket-by-bucket aggregation), and an INFERENCE function that is configured to return a set of keys exhibiting anomalous behavior. The use of such functions for detection and mitigation of attacks is discussed further below.

The communication network 110, as discussed above, may be configured to perform attack detection and mitigation based on the use of reversible sketches. The edge routers 113 may be configured to monitor network traffic for request packets and response packets, generate reversible sketches for the request packets and the response packets, and provide the reversible sketches to the central controller 115. The edge routers 113-1-113-E include network traffic collection elements 114-1-114-E (collectively, network traffic collection elements 114), respectively, that may be configured to provide such functions in support of attack detection and mitigation for communication network 110. The central controller 115 is configured to receive the reversible sketches from the edge routers 113 and to determine, based on the reversible sketches, whether a traffic anomaly indicative of an attack on the communication network 110 is detected. The central controller 115 is configured to aggregate the reversible sketches from the edge routers 113 to form an aggregated reversible sketch, analyze the aggregated reversible sketch to identify anomalies indicative of an attack on the communication network 110, and to initiate mitigation of the attack on the communication network 110. The central controller 115 includes a network traffic analysis element 116 configured to provide such functions in support of attack detection and mitigation for communication network 110. It is noted that distributed collection of network traffic information across the edge routers 113 and centralized aggregation and analysis of the network traffic information at the central controller 115 ensures that domain level network traffic information is collected and analyzed (which accounts for various types of network technologies—such as load balancing, fragmentation, or the like—which may cause pairwise request-response packet pairs to traverse different paths in the communication network 110). These and various other functions supported by elements of communication network 110 for performing attack detection and mitigation are discussed further below.

The edge routers 113 may be configured to support attack detection and mitigation for communication network 110.

The edge routers 113 may be configured to monitor network traffic, generate network traffic information based on monitoring of the network traffic, and send the network traffic information to the central controller 115.

The edge routers 113 may be configured to monitor network traffic and generate the network traffic information at the data flow level. The edge routers 113 may be configured to aggregate packets into flows using the NetFlow standard or other mechanisms configured for use in aggregating packets into flows. It is noted that collection of network traffic information at the data flow level reduces collection cost.

The edge routers 113 may be configured to monitor network traffic and generate the network traffic information based on reversible sketches. The edge routers 113 may be configured to monitor network traffic and generate the network traffic information using a pair of reversible sketches including: (1) a reversible sketch configured to record outgoing request packets exiting the communication network via the edge router 113 (denoted as Out-RS) and (2) a reversible sketch configured to record incoming response packets entering the communication network via the edge router 113 (denoted as In-RS). The edge routers 113 may be configured to generate the reversible sketches based on use of the UPDATE function, which is configured to update a reversible sketch when new traffic arrives, thereby enabling monitoring of network traffic in real time. It is noted that use of reversible sketches for collection of network traffic information at the edge routers 113 reduces storage cost.

In Out-RS, the key that identifies a data flow may be the combination of destination IP address and destination port (denoted as {DIP, DP}) and the value may be the flow size of the data flow (e.g., the number of packets in the data flow, the amount of packet data in the data flow, or the like). In this case, the UPDATE function in Out-RS may be written as $T[i][h_i(DIP\&DP)]+=$flow size, $i=(1, 2, \ldots, H)$. It will be appreciated that other keys may be used and that data flows may be defined in other ways (e.g., based on other combinations of fields of the packet headers).

In In-RS, the key that identifies a data flow may be the combination of source IP address and source port (denoted as {SIP, SP}) and the value may be the flow size of the data flow (e.g., the number of packets in the data flow, the amount of packet data in the data flow, or the like). In this case, the UPDATE function in In-RS may be written as $T[i][h_i(SIP\&SP)]+=$flow size, $i=(1, 2, \ldots, H)$. It will be appreciated that other keys may be used and that data flows may be defined in other ways (e.g., based on other combinations of fields of the packet headers).

It is noted that, while selecting the key as {SIP, SP} in Out-RS and selecting the key as {DIP, DP} in In-RS also would satisfy the purpose of matching incoming response packets entering the communication network 110 with the corresponding outgoing request packets that were previously sent out from the communication network 110, selecting the key as {DIP, DP} in Out-RS and selecting the key as {SIP, SP} in In-RS enables identification of the addresses of the reflectors 120 (since a reflector 120 that is used to facilitate an attack would be a destination (i.e., DIP) of request packets exiting the communication network 110 and a source (i.e., SIP) of response packets entering the communication network 110), such that attack mitigation may be performed when a traffic anomaly indicative of an attack is detected (e.g., controlling traffic coming from a reflector 120 that is being used to facilitate an attack).

It will be appreciated that use of flow-level network traffic information collection based on reversible sketches may be considered to be use of dual efficient capabilities for reducing both collection and storage costs at the edge routers 113, thereby enabling collection of network traffic information in the presence of massive volumes of traffic with reduced system burden.

The edge routers 113 may be configured to send the network traffic information to the central controller 115. The network traffic information of an edge router 113, as discussed above, includes the Out-RS reversible sketch of the edge router 113 and the In-RS reversible sketch of the edge router 113. The edge routers 113 may send the network traffic information to the central controller 115 using various protocols, message formats, or the like, as well as various combinations thereof. It is noted that the sending of the network traffic information by the edge routers 113 to the central controller 115 is illustrated in FIG. 1 as the TRAFFIC RECORD elements.

The central controller 115 is configured to support attack detection and mitigation for communication network 110.

The central controller 115 is configured to receive the network traffic information from the edge routers 113. The network traffic information of an edge router 113, as discussed above, includes the Out-RS reversible sketch of the edge router 113 and the In-RS reversible sketch of the edge router 113. The central controller 115 may receive the network traffic information from the edge routers 113 using various protocols, message formats, or the like, as well as various combinations thereof. It is noted that the receipt of the network traffic information at the central controller 115 from the edge routers 113 is illustrated in FIG. 1 as the TRAFFIC RECORD elements.

The central controller 115 is configured to aggregate the reversible sketches from the edge routers 113 to form an aggregated reversible sketch, analyze the aggregated reversible sketch to identify anomalies indicative of an attack on the communication network 110, and to initiate mitigation of the attack on the communication network 110.

The central controller 115 is configured to aggregate the reversible sketches from the edge routers 113 to form an aggregated reversible sketch. The aggregated reversible sketch includes the network traffic information of the edge routers 113, as if the traffic of the edge routers 113 had passed through a single router.

The central controller 115 may be configured to aggregate the reversible sketches from the edge routers 113 by applying a COMBINE function, which is configured to linearly combine multiple reversible sketches into a single reversible sketch (e.g., using bucket-by-bucket aggregation).

In applying the COMBINE function, in order to identify mismatches between request packets and response packets (which might be indicative of an attack on the communication network 110), weights are applied to the Out-RS reversible sketches and the In-RS reversible sketches of the edge routers 113 to reflect matching of request packets and response packets. The weights may be applied in a manner that cancels the respective measures of request packets exiting the communication network 110 via the respective edge routers 113 for respective data flows and the respective measures of response packets entering the communication network 110 via the respective edge routers 113 for respective data flows. The weights may be applied in a manner that produces anomalous values in buckets of the aggregated reversible sketch during an attack. For example, for a given data flow defined for a specific address and port of a reflector 120, if there are 16 request packets associated with the data flow (i.e., that left the communication network 110 for the data flow, based on {DIP, DP}) and 100 response packets associated with the data flow (i.e., that entered the communication network 110 for the data flow, based on {SIP, SP}), the weights may be applied such that 16 of the response packets are matched to (and, thus, cancel out) 16 of the response packets, thereby leaving 84 unmatched response packets that should not have been entered the communication network 110 since no corresponding request packets were sent.

In at least some embodiments, for example, weights may be applied such that outgoing request packets exiting the communication network 110 are weighted negatively and incoming response packets entering the communication network 110 are weighted positively. For example, weights of −1 and +1 (or other suitable weights, such as −2/+2 or the like) may be allocated to Out-RS reversible sketches and the In-RS reversible sketches, respectively. The definition of weights such that outgoing request packets are weighted negatively and incoming response packets are weighted positively ensures that, when an amplification attack occurs, large positive values will be observed in buckets of the aggregated reversible sketch (due to the large number of response packets associated with given request packets). The formula for the aggregation of reversible sketches of the edge routers 113 using the COMBINE function, where outgoing request packets are weighted negatively and incoming response packets are weighted positively, may be specified as follows: $T_{RS}[i][j]=\Sigma_{n=1}^{N} T_{In-RS_n}[i][j]+(-1) T_{Out-RS_n}[i][j]$, where $T_{RS}[i][j]$ is represented as each bucket in the aggregated reversible sketch, $T_{Out-RS}[i][j]$ and $T_{In-RS}[i][j]$ are represented as each bucket in Out-RS and In-RS respectively, N is the number of edge routers (n=1, 2, . . . , N), and i=(1, 2, . . . , H) and j=(1, 2, . . . , M).

In at least some embodiments, for example, weights may be applied such that outgoing request packets are weighted positively and incoming response packets are weighted negatively. For example, weights of +1 and −1 (or other suitable weights, such as +2/−2 or the like) may be allocated to Out-RS reversible sketches and the In-RS reversible sketches, respectively. The definition of weights such that outgoing request packets are weighted positively and incoming response packets are weighted negatively ensures that, when an amplification attack occurs, large negative values will be observed in buckets of the aggregated reversible sketch (due to the large number of response packets associated with given request packets). The formula for the aggregation of reversible sketches of the edge routers 113 using the COMBINE function, where outgoing request packets are weighted positively and incoming response packets are weighted negatively, may be specified in a manner similar to that described above for the case in which positive/negative weighting is reversed.

The central controller 115 is configured to analyze the aggregated reversible sketch to identify anomalies indicative of an attack on the communication network 110.

The central controller 115 is configured to analyze the aggregated reversible sketch to identify anomalies by analyzing each bucket of the aggregated reversible sketch to determine whether the bucket is anomalous. The buckets correspond to keys which in turn correspond to flows associated with destination addresses. The determination as to whether a given bucket is anomalous may be based on a comparison of a value of the bucket to a threshold (denoted as R). The value of R may be set in various ways, depending on various factors (e.g., application of weights to the reversible sketches from the edge routers 113, protocol type, or the like, as well as various combinations thereof. For example, in some embodiments, since a host should not receive a response packet from a server if it did not send a request packet to that server, any bucket with a non-zero value (e.g., a positive value where outgoing request packets are weighted negatively and incoming response packets are weighted positively or a negative value where outgoing request packets are weighted positively and incoming response packets are weighted negatively) may be identified as being anomalous. However, considering the IP fragmentation transmission of response packets of some protocols, the value of R may be set to be a small non-zero value (it is noted that such non-zero values are suitable since, when an amplification attack takes place, the values in the anomalous buckets, generally, are much larger than such small non-zero values due to the large number of response packets that are generated). It will be appreciated that the buckets of the aggregated reversible sketch may be analyzed in other ways for determining whether the buckets are anomalous.

In at least some embodiments, identification of an anomalous bucket for a key results in identification of the key as being an anomalous key for which attack mitigation is initiated.

In at least some embodiments, identification of an anomalous bucket for a key may or may not result in identification of the key as being an anomalous key for which attack mitigation is initiated. In at least some embodiments, a mechanism for reducing false positives may be utilized. In at least some embodiments, identification of an anomalous bucket for a key results in inclusion of the key in a list of potentially anomalous keys. The aggregated reversible sketch may be analyzed on a per-row basis in order to produce, for each of the rows of the aggregated reversible sketch, a respective list of potentially anomalous keys (i.e., the list of potentially anonymous keys includes each key of the row that is associated with an anomalous bucket of that row). This may be based on use of the INFERENCE function and a threshold (where this threshold may be denoted as R) which is used to determine, for each key in the row, whether the value associated with the key is potentially anomalous (e.g., satisfying the threshold) and, thus, whether that key is considered to be potentially anomalous. This results in a set of H lists of potentially anomalous keys (i.e., a respective list for each of the H rows of the aggregated reversible sketch). The set of H lists of potentially anomalous keys may then be analyzed to determine which of the potentially anonymous keys are identified as actual anomalous keys for which attack mitigation is initiated. In at least some embodiments, analysis of the set of H lists of potentially anonymous keys to determine which of the potentially anonymous keys are identified as actual anomalous keys may be based on a voting process that is configured to reduce the false positive rate for anomalous keys. In at least some embodiments, the voting process is configured such that a potentially anomalous key is identified as an actual anomalous key based on a determination that the key is included in at least a threshold number of lists of potentially anomalous keys (where this threshold may be denoted as W). The threshold number of lists of potentially anonymous keys may be set based on the number of hash tables H (e.g., to H/2, H/3, or in any other suitable manner configured to balance identification of attacks versus suppression of false positives).

The central controller 115 is configured to initiate mitigation of the attack. The central controller 115 is configured to identify the source address of a reflector 120 associated with the identified attack and, based on identification of the source address of the reflector 120 associated with the identified attack, to initiate one or more or more actions for mitigating the identified attack.

The central controller 115 is configured to identify the source address of a reflector 120 associated with the identified attack. The central controller 115, for a key identified as being an anomalous key associated with an attack, is configured to identify the source address of the reflector 120 associated with the key. It is noted that, while the reflector 120 is innocent (namely, it is merely performing its function of sending response packets in response to request packets, without knowledge that the request packets are spoofed by a malicious entity), it is sending a large quantity of response packets and, thus, facilitating the attack. The central controller 115 may obtain the source address of the reflector 120 from the aggregated reversible sketch.

The central controller 115 is configured to initiate one or more actions for mitigating an identified attack. The central controller 115 may be configured to send instructions to edge routers 113 for triggering the edge routers 113 to mitigate an identified attack. For example, the central controller 115 may be configured to send, toward the edge routers 113, instructions for the edge routers 113 to control traffic of a data flow identified as having a traffic anomaly associated therewith (e.g., an anomalous traffic flow which comes from a particular address and port of a particular reflector 120, as identified by the central controller 115 from the aggregated reversible sketch). The instruction to control traffic of a data flow identified as having a traffic anomaly associated therewith may be sent to all of the edge routers 113 or to a subset of the edge routers 113 (e.g., where it is known that packets of the data flow may only enter communication network 110 via that subset of edge routers 113). The traffic control instructions may include instructions to filter traffic, instructions to block traffic, or the like, as well as various combinations thereof. It is noted that the sending of the traffic control instructions from the central controller 115 to edge routers 113 is illustrated in FIG. 1 as the TRAFFIC CONTROL COMMAND elements. The central controller 115 may be configured to initiate one or more other actions for mitigating an identified attack.

The edge routers 113 may be configured to perform one or more actions for mitigating an attack identified by the central controller 115. The edge routers 113 may be configured to perform the one or more actions for mitigating an attack based on instructions received from the central controller 115 (or from any other suitable source of such instructions). For example, the edge routers 113 may be configured to receive, from the central controller 115, instructions to control traffic of data flows identified as having traffic anomalies associated therewith and to control the traffic of the data flows identified as having traffic anomalies associated therewith based on the instructions from the central controller 115 (e.g., controlling traffic of an anomalous traffic flow which comes from a particular address and port of a particular reflector 120, as identified by the central controller 115 from the aggregated reversible sketch). The traffic control instructions may include instructions to filter traffic, instructions to block traffic, or the like, as well as various combinations thereof. It is noted that the receipt of the traffic control instructions by the edge routers 113 from the central controller 115 is illustrated in FIG. 1 as the TRAFFIC CONTROL COMMAND elements. The edge routers 113 may be configured to perform one or more other actions for mitigating an attack identified by the central controller 115.

It will be appreciated that the collection of network traffic information based on reversible sketches by the edge routers 113 and aggregation and analysis of the network traffic information of the edge routers 113 based on reversible sketches by the central controller 115 continues over time. When the central controller 115 initiates control of traffic from an anomalous source address (e.g., filtering, blocking, or the like), the control of traffic from the anomalous source address by the edge routers 113 should mitigate the attack over time. This will cause the counts of incoming response packets from the anomalous source address to fall over time. This drop in the number of incoming response packets from the anomalous source address, over time, will be reflected in the In-RS reversible sketches generated by the edge routers 113 and, thus, after being provided to the central controller 115, also will be reflected in the aggregated reversible sketches generated by the central controller 115 based on the In-RS reversible sketches received from the edge routers 113. The value in the bucket of the key associated with the source address will fall over time such that, eventually, the key associated with the source address will be removed from the list of anomalous keys for which attack mitigation is performed. The removal of the key associated with the source address from the list of anomalous keys for which attack mitigation is performed triggers the central controller 115 to initiate removal of attack mitigation for the source address. The removal of attack mitigation may use a process that is a reverse of the process used to apply attack mitigation. For example, the central controller 115 may send instructions to edge routers 113 for triggering the edge routers 113 to stop attack mitigation functions (e.g., for example, the central controller 115 may be configured to send, toward the edge routers 113, instructions for the edge routers 113 to stop controlling the traffic of data flows which come from anomalous source addresses identified by the central controller 115 from the aggregated reversible sketch) and the edge routers 113 may stop attack mitigation functions based on the instructions from the central controller 115 (e.g., for example, the edge routers 113 may be configured to receive, from the central controller 115, instructions to stop controlling traffic of the data flows identified as having traffic anomalies associated therewith and to stop controlling the traffic of the data flows identified as having traffic anomalies associated therewith). In other words, controlling of traffic from the anomalous source address continues until the anomalous source address disappears from the list of anomalous keys for which attack mitigation was initiated. This enables reevaluation of the situation by the central controller 115 over time to ensure that attack mitigation is applied when needed and remove when no longer needed.

It will be appreciated that the detection and mitigation of attacks over time may be based on an attack detection and mitigation schedule.

The edge routers 113 may be configured to monitor network traffic to generate network traffic information and to send the network traffic information to the central controller 115 based on attack detection and mitigation schedule. The attack detection and mitigation schedule defines collection times during which the edge routers 113 collect the network traffic information and after which the edge routers 113 send the network traffic information to the central controller 115. The collection time for the edge routers 113 may be set to be equal to or a little greater than the round trip time (RTT), since it is expected that the corresponding response packet for a given request packet should be received within the RTT. The edge routers 113 may be configured such that, during a given collection time, the Out-RS and In-RS reversible sketches at the respective edge routers 113 continuously record traffic information associated with traffic at the respective edge routers 113 in real time. The edge routers 113 may be configured such that the network traffic information collected by the respective edge routers 113 (namely, the Out-RS and In-RS data structures) during a given collection time are delivered to the central controller 115 after the collection time.

The central controller 115 is configured to aggregate the reversible sketches from the edge routers 113 to form the aggregated reversible sketch and analyze the aggregated reversible sketch to identify anomalies indicative of an attack on the communication network 110 based on the attack detection and mitigation schedule. The attack detection and mitigation schedule defines collection times during which the edge routers 113 collect the network traffic information and after which the edge routers 113 send the network traffic information to the central controller 115 for aggregation and analysis. As previously discussed, the collection time for the edge routers 113 may be set to be equal to or a little greater than RTT. The central controller 115 may be configured to aggregate the reversible sketches from the edge routers 113 to form the aggregated reversible sketch and analyze the aggregated reversible sketch to identify anomalies indicative of an attack on the communication network 110 once per collection period, once every other collection period, or the like.

It will be appreciated that the detection and mitigation of attacks over time may be based on various other suitable types of timing and control information.

The edge routers 113 and the central controller 115 may be configured to provide various other functions supporting detection and mitigation of attacks in communication network 110.

The communication network 110 is configured to control detection and mitigation of attacks based on various parameters discussed above. For example, four of the parameters discussed herein in conjunction with detection and mitigation of attacks include the number of hash functions (H), the sketch width (M), the bucket threshold for determining whether a bucket is anomalous (R), and a list threshold for determining whether a key is anomalous (W).

The communication network 110 may be configured to control the values of these parameters, including dynamic modification of these parameters, in order to provide finer control over detection and mitigation of attacks in terms of resources consumed in detection and mitigation of attacks, balancing identification of attacks with false positives, or the like, as well as various combinations thereof. The impacts of using various values for such parameters is discussed further below.

For parameters H and M, it is noted that the performance of attack detection and memory consumption primarily depends on the values of H and M. The values of H and M within the context of communication network 110 may be determined based on a combination of the theoretical derivation of reversible sketch data structures and an experimental environment. It will be appreciated that the values of parameters H and M within the context of communication network 110 may be determined in other ways.

For parameter R, it is noted that, if a host does not send out any request packets to a given server, then it should not receive response packets from that server. Hence, any bucket with a positive value can be regarded as anomalous. However, considering the IP fragmentation transmission of response packets of some protocols, R may be set to be a small non-zero value, such as a small positive value (e.g., 5, 10, 15, 20, or the like) where outgoing request packets are weighted negatively and incoming response packets are weighted positively or a small negative value (e.g., −5, −10, −15, −25, or the like) where outgoing request packets are weighted positively and incoming response packets are weighted negatively. It is noted that such values are suitable since, when an amplification attack takes place, the values in anomalous buckets, generally, are much larger than such values due to the large number of response packets that are generated. It will be appreciated that the value of parameter R within the context of communication network 110 may be set in other ways.

For parameter W, it is noted that the value of W may be set based on the value of the number of hash functions (H). For example, W can be set as [H/2]. That is to say, a key may be considered to be an attacking source if that key exhibits anomalous behavior in at least [H/2] rows. It will be appreciated that the value of parameter W within the context of communication network 110 may be set in other ways.

Figure 2:
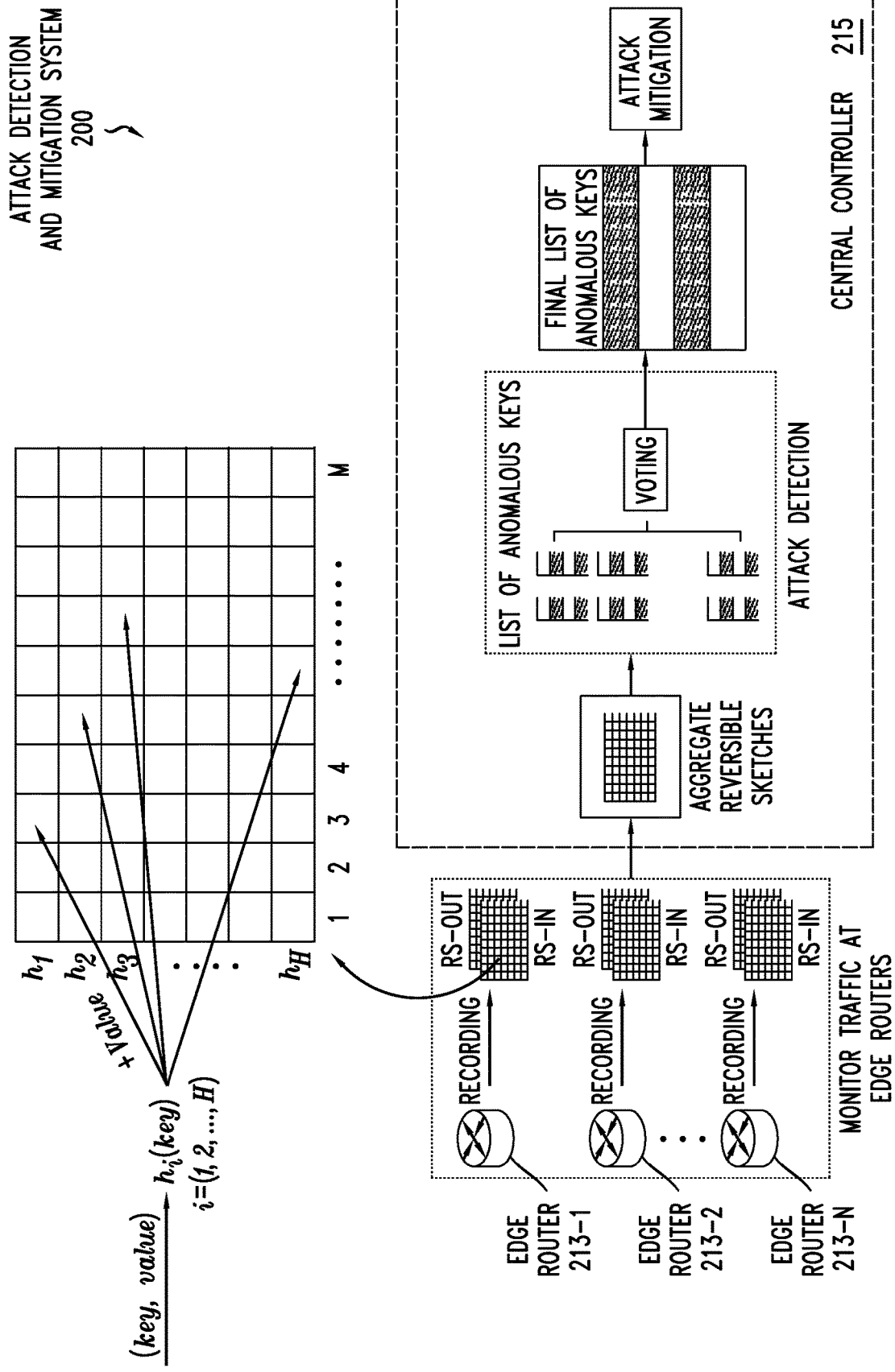
FIG. 2 depicts an example attack detection and mitigation system configured to support detection and mitigation of an attack in a communication network.

FIG. 2 depicts an example attack detection and mitigation system configured to support detection and mitigation of an attack in a communication network.

The attack detection and mitigation system 200 includes a set of edge routers 213 and a central controller 215.

The edge routers 213 each monitor traffic, generate reversible sketches for outgoing request packets and incoming response packets (illustrative, two reversible sketches, denoted as RS-Out and RS-In, are depicted as being generated by each edge router 213), and send the reversible sketches to the central controller 215.

The central controller 215 receives the reversible sketches from the edge routers 213, aggregates the reversible sketches from the edge routers 213 to form an aggregated reversible sketch, performs attack detection based on the aggregated reversible sketch (e.g., by identifying a list of anomalous keys associated with traffic anomalies and using a voting mechanism to identify a final list of anomalous keys) to identify an attack, and initiates attack mitigation in order to mitigate the attack.

It will be appreciated that the various functions performed by the edge routers 213 and the central controller 215 in the attack detection and mitigation system 200 may be further understood when considered in conjunction with the description of the communication system 100 of FIG. 1.

It will be appreciated that, although primarily presented herein within the context of example embodiments in which a particular type of data structure (namely, a reversible sketch) is used to provide traffic records used in attack detection and mitigation, various other data structures supporting collection, aggregation, and analysis of traffic information for anomaly detection may be used to provide traffic records for attack detection and mitigation.

Figure 3:
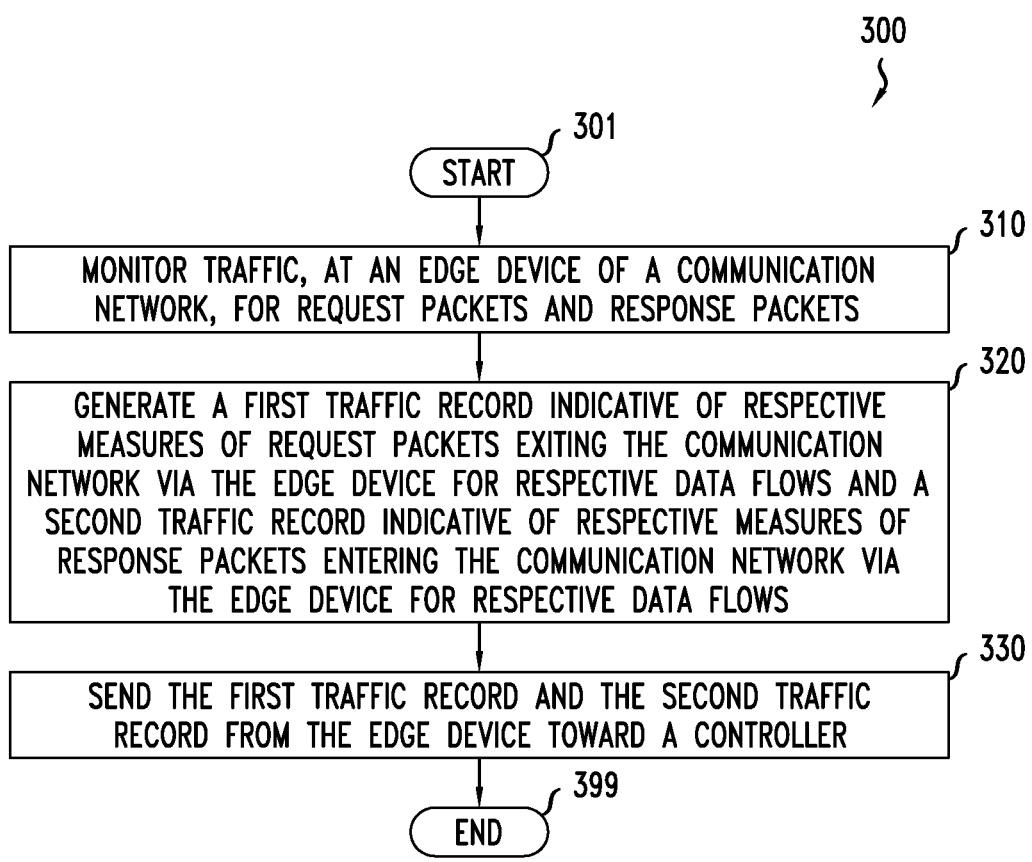
FIG. 3 depicts an example embodiment of a method for use by an edge device to support detection and mitigation of an attack in a communication network.

FIG. 3 depicts an example embodiment of a method for use by an edge device to support detection and mitigation of an attack in a communication network. The edge device may be an edge router (e.g., an edge router 113 of FIG. 1) or other suitable type of edge device. It will be appreciated that, although primarily presented as being performed serially, at least a portion of the functions may be performed contemporaneously or in a different order than as presented in FIG. 3. At block 301, method 300 begins. At block 310, traffic at the edge device of the communication network is monitored for request packets and response packets. At block 320, a first traffic record indicative of respective measures of request packets exiting the communication network via the edge device for respective data flows is generated and a second traffic record indicative of respective measures of response packets entering the communication network via the edge device for respective data flows is generated. At block 330, the first traffic record and the second traffic record are sent from the edge device toward a controller. At block 399, method 300 ends.

Figure 4:
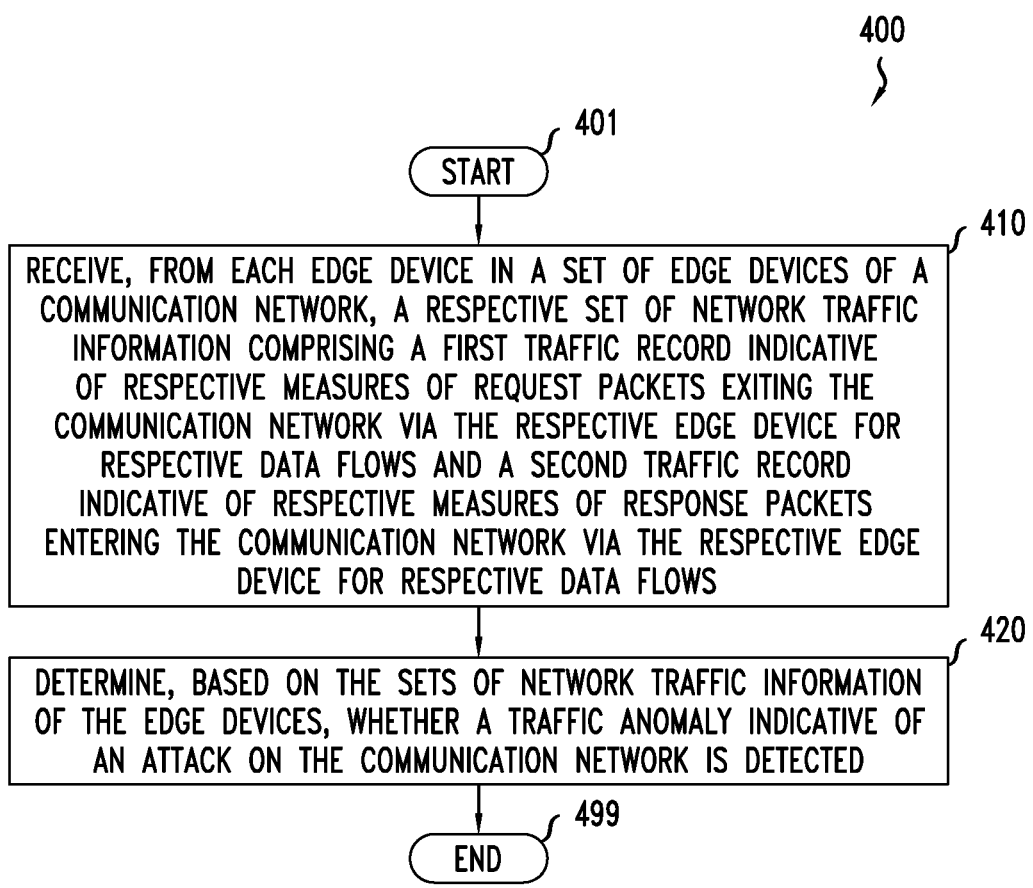
FIG. 4 depicts an example embodiment of a method for use by a controller to support detection and mitigation of an attack in a communication network.

FIG. 4 depicts an example embodiment of a method for use by a controller to support detection and mitigation of an attack in a communication network. The controller may be a central controller (e.g., central controller 115 of FIG. 1) or other suitable type of controller. It will be appreciated that, although primarily presented as being performed serially, at least a portion of the functions may be performed contemporaneously or in a different order than as presented in FIG. 4. At block 401, method 400 begins. At block 410, for each edge device in a set of edge devices of a communication network, a respective set of network traffic information is received where the network traffic information for the respective edge device includes a first traffic record indicative of respective measures of request packets exiting the communication network via the respective edge device for respective data flows and a second traffic record indicative of respective measures of response packets entering the communication network via the respective edge device for respective data flows. At block 420, a determination is made, based on the sets of network traffic information of the edge devices, as to whether a traffic anomaly indicative of an attack on the communication network is detected. At block 499, method 400 ends.

Figure 5:
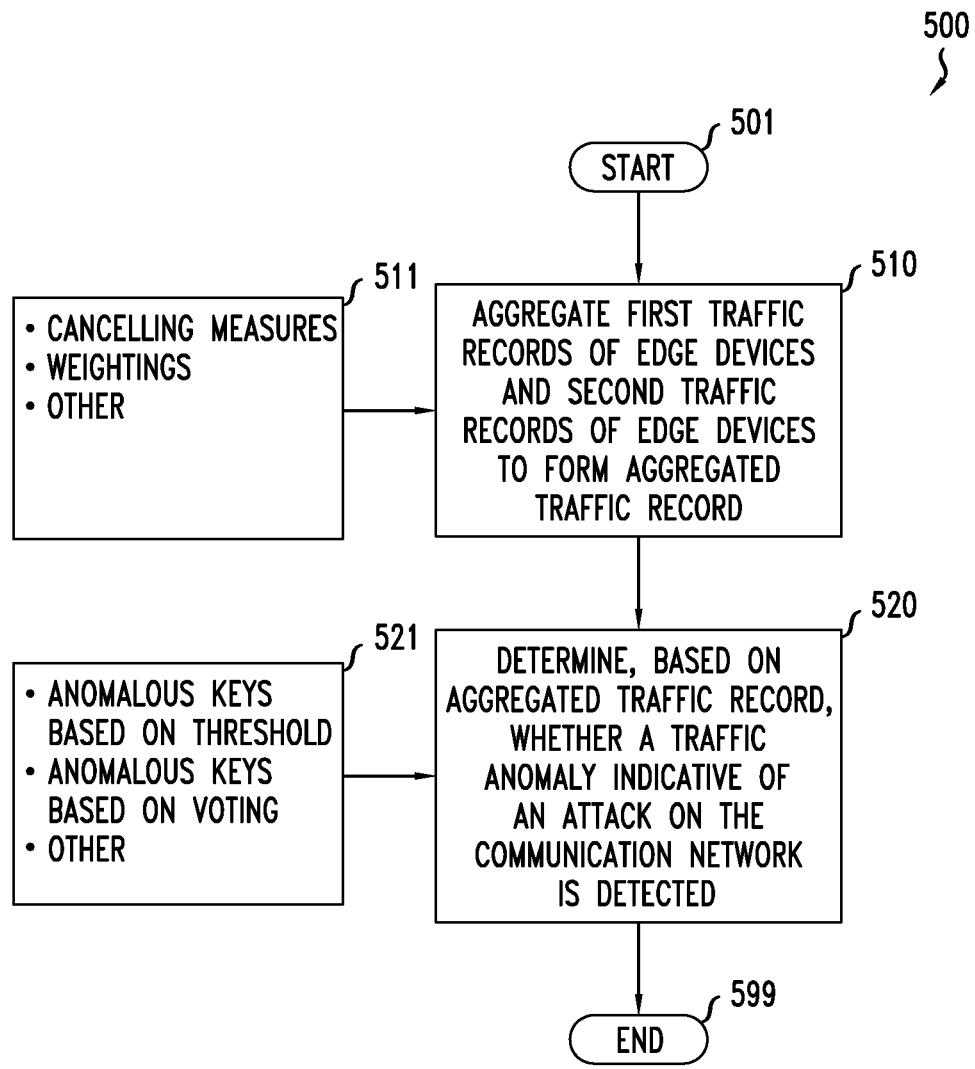
FIG. 5 depicts an example embodiment of a method for use by a controller to support detection and mitigation of an attack in a communication network.

FIG. 5 depicts an example embodiment of a method for use by a controller to support detection and mitigation of an attack in a communication network. The controller may be a central controller (e.g., central controller 115 of FIG. 1) or other suitable type of controller. The method 500 of FIG. 5 may be suitable for use as block 420 of method 400 of FIG. 4. It will be appreciated that, although primarily presented as being performed serially, at least a portion of the functions may be performed contemporaneously or in a different order than as presented in FIG. 5. At block 501, method 500 begins. At block 510, the first traffic records of the edge devices (indicative of respective measures of request packets exiting the communication network via the respective edge devices for respective data flows) and the second traffic records of the edge devices (indicative of respective measures of response packets entering the communication network via the respective edge devices for respective data flows) are aggregated to form an aggregated traffic record. As indicated by block 511, the aggregation of the first traffic records of the edge devices and the second traffic records of the edge devices to form the aggregated traffic record may be performed in a manner for cancelling the respective measures of request packets exiting the communication network via the respective edge devices for respective data flows and the respective measures of response packets entering the communication network via the respective edge devices for respective data flows, may be performed based on weightings (e.g., weighting respective measures of request packets exiting the communication network via the respective edge device for respective data flows and the respective measures of response packets entering the communication network via the respective edge device for respective data flows in a manner tending to enabling matching of request and response packets), or the like, as well as various combinations thereof. At block 520, a determination is made, based on the aggregated traffic record, as to whether a traffic anomaly indicative of an attack on the communication network is detected. A traffic anomaly indicative of an attack on the communication network is associated with a data flow (e.g., the key defines the data flow). As indicated by block 521, the determination as to whether a traffic anomaly indicative of an attack on the communication network is detected may include identifying anomalous keys (e.g., having anomalous flow size measures, such as flow size measures indicative of a greater number of response packets than request packets or greater quantity of response packet data than request packet data) based on a threshold (e.g., flow size threshold), based on voting (e.g., identifying a key as being anomalous based on a determination that the key appears in an aggregated packet record a threshold number of times), or the like, as well as various combinations thereof. As indicated by block 521, the determination as to whether a traffic anomaly indicative of an attack on the communication network is detected may be based on various other types of information or analysis of the aggregated traffic record. At block 599, method 500 ends.

Figure 6:
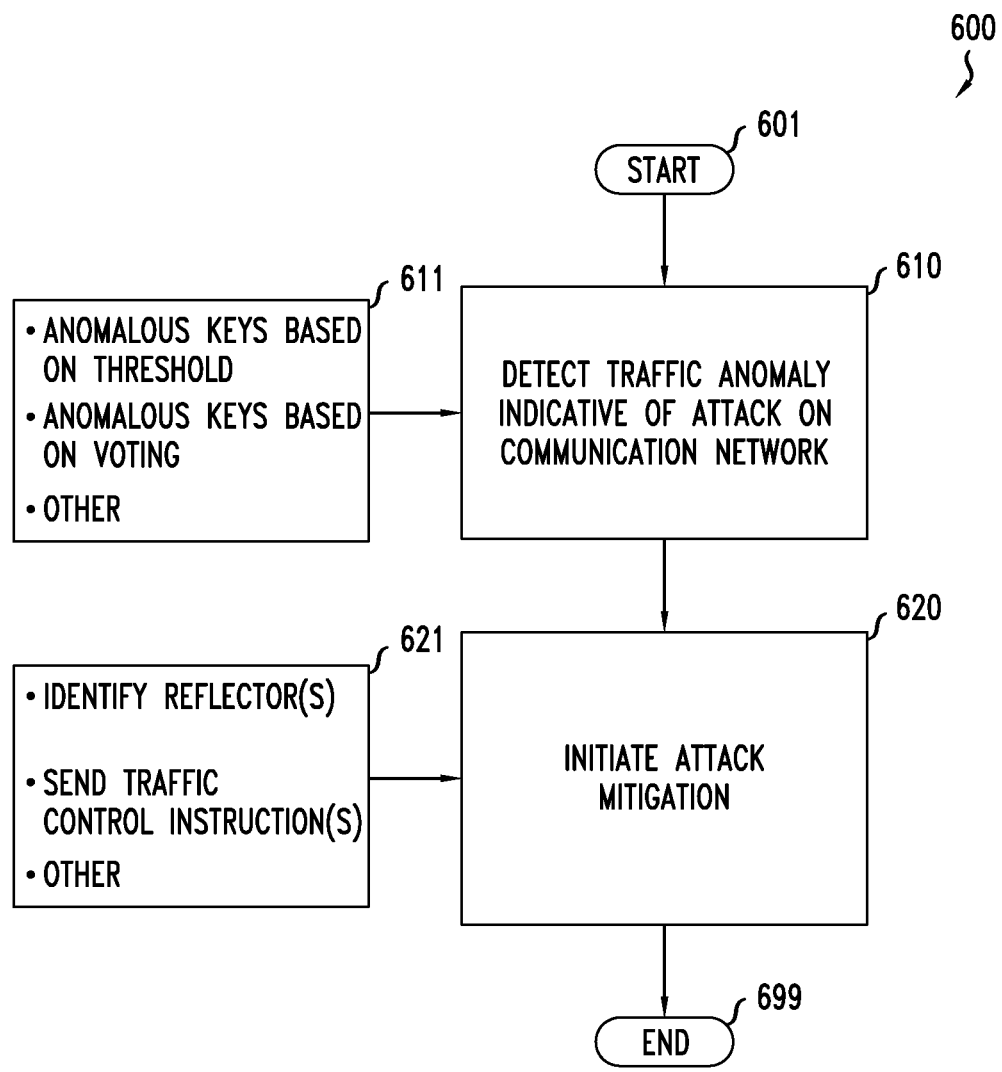
FIG. 6 depicts an example embodiment of a method for use by a controller to support detection and mitigation of an attack in a communication network.

FIG. 6 depicts an example embodiment of a method for use by a controller to support detection and mitigation of an attack in a communication network. The controller may be a central controller (e.g., central controller 115 of FIG. 1) or other suitable type of controller. It will be appreciated that, although primarily presented as being performed serially, at least a portion of the functions may be performed contemporaneously or in a different order than as presented in FIG. 6. At block 601, method 600 begins. At block 610, a traffic anomaly indicative of an attack on the communication network is detected. The traffic anomaly indicative of the attack on the communication network is associated with a data flow (e.g., the key defines the data flow). As indicated by block 611, the traffic anomaly indicative of the attack on the communication network may be detected by identifying anomalous keys (e.g., having anomalous flow size measures, such as flow size measures indicative of a greater number of response packets than request packets or greater quantity of response packet data than request packet data) based on a threshold (e.g., flow size threshold), based on voting (e.g., identifying a key as being anomalous based on a determination that the key appears in an aggregated packet record a threshold number of times), or the like, as well as various combinations thereof. As indicated by block 611, the traffic anomaly indicative of the attack on the communication network may be detected based on various other types of information or analysis. At block 620, attack mitigation is initiated for the attack on the communication network. As indicated by block 621, attack mitigation may include identifying the reflector(s) associated with the attack, sending various traffic control instructions (e.g., filtering, blocking, or the like), or the like, as well as various combinations thereof. At block 699, method 600 ends.

Various example embodiments supporting attack detection and mitigation may provide various advantages or potential advantages.

For example, various example embodiments supporting attack detection and mitigation may be configured to support detection and mitigation of attacks in a protocol-independent manner. Various example embodiments supporting attack detection and mitigation may be configured to exploit basic attack characteristic of amplification attacks that cause the unbalanced relationship between request packets and response packets in order to detect such amplification attacks. There are many protocols that can be exploited for launching amplification attacks and, since it is unlikely to be able to predict which type of amplification attacks will occur, a protocol-independent method is highly valuable for evaluating Internet security as a whole.

For example, various example embodiments supporting attack detection and mitigation may be configured to support detection and mitigation of attacks in the presence of large quantities of network traffic with high accuracy and efficiency. Various example embodiments supporting attack detection and mitigation may be configured to support efficient processing of large-scale traffic, thereby ensuring that large quantities of valid network traffic do not swamp significant signals of attacks and, thus, enabling detection and mitigation of attacks in the presence of large quantities of network traffic. It will be appreciated that such support for efficient processing of large-scale traffic enables detection and mitigation of attacks at the victim end, thereby obviating the need for use of reflector-end detection methods which typically have the following drawbacks: (i) the large number of potential reflectors makes detection methods difficult to deploy in practice, and (ii) illegitimate requests with spoofed addresses might look the same as legitimate requests. Thus, various example embodiments supporting attack detection and mitigation can alleviate the impact of large-scale network traffic on attack detection, supporting more efficient and accurate attack detection while handling a massive volume of network traffic.

For example, various example embodiments supporting attack detection and mitigation may be configured to support detection and mitigation of attacks in high-speed networks. In high-speed networks (e.g., with rates of up to hundreds of Gigabits per second), collection of packets generally relies upon expensive hardware and infrastructures. Various example embodiments supporting attack detection and mitigation may be configured to utilize flow-level data, which is suitable for collection in high-speed networks, as flow-level data generally has a more macroscopic view of the network traffic. Various example embodiments supporting attack detection and mitigation may be configured to, at each of the network elements at which data is collected, aggregate packets into flows (e.g., based on the NetFlow standard or using other suitable flow-level packet aggregation functions) and directly collect flow-level data, thereby providing improved support for deployment of attack detection and mitigation functions in high-speed networks.

For example, various example embodiments supporting attack detection and mitigation may be configured to support detection and mitigation of attacks with relatively low memory consumption. In IPv4, for example, the size of SIP/DIP is 32 bits and the size of SP/DP is 16 bits such that, if keeping per-flow status for each {SIP&SP}/{DIP&DP} pair, then the size of monitored key space is at least $2^{48}$ bits. Various example embodiments supporting attack detection and mitigation may be configured to reduce memory consumption by utilizing reversible sketch data structures to record traffic information. As discussed herein, a reversible sketch data structure is a compact, constant-sized data structure that summarizes network traffic by using hash functions to randomly aggregate traffic. In the case of IPv4, for example, use of reversible sketch data structures reduces the monitored key space of at least $2^{48}$ bits to a fixed size (e.g., $M=2^{20}$, $H=10$) by aggregating multiple {SIP&SP}/{DIP&DP} pairs into common buckets. It is noted that, while there is a chance for collisions, there are various mechanisms available for resolving recording errors caused by such collisions. It is noted that memory savings also may be realized for other protocols (e.g., IPv6 or the like).

Various example embodiments supporting attack detection and mitigation may provide various other advantages or potential advantages.

Figure 7:
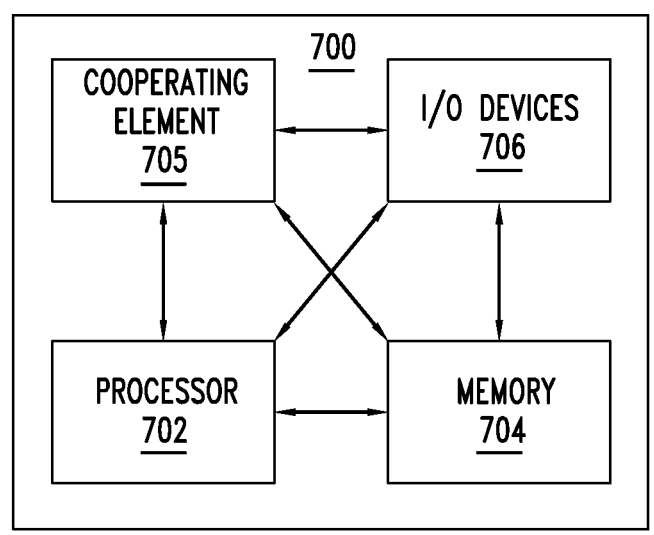
FIG. 7 depicts a high-level block diagram of a computer suitable for use in performing various functions described herein.

FIG. 7 depicts a high-level block diagram of a computer suitable for use in performing various functions described herein.

The computer 700 includes a processor 702 (e.g., a central processing unit (CPU), a processor having a set of one or more processor cores, or the like) and a memory 704 (e.g., a random access memory (RAM), a read only memory (ROM), or the like). The processor 702 and the memory 704 are communicatively connected.

The computer 700 also may include a cooperating element 705. The cooperating element 705 may be a hardware device. The cooperating element 705 may be a process that can be loaded into the memory 704 and executed by the processor 702 to implement functions as discussed herein (in which case, for example, the cooperating element 705 (including associated data structures) can be stored on a non-transitory computer-readable storage medium, such as a storage device or other storage element (e.g., a magnetic drive, an optical drive, or the like)).

The computer 700 also may include one or more input/output devices 706. The input/output devices 706 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices or elements (e.g., a tape drive, a floppy drive, a hard disk drive, a compact disk drive, or the like), or the like, as well as various combinations thereof.

It will be appreciated that computer 700 of FIG. 7 may represent a general architecture and functionality suitable for implementing functional elements described herein, portions of functional elements described herein, or the like, as well as various combinations thereof. For example, computer 700 may provide a general architecture and functionality that is suitable for implementing one or more of a communication device 111, an edge router 113, a network traffic collection element 114, central controller 115, network traffic analysis element 116, a reflector 120, an attacker 130, an element of a botnet 140, an edge router 213, central controller 215, or the like.

It will be appreciated that the functions depicted and described herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits (ASIC), and/or any other hardware equivalents).

It will be appreciated that at least some of the functions discussed herein as software methods may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. A communication network edge device ("edge device") comprising:
    at least one processor; and
    at least one memory including computer program code;
    wherein the at least one memory and the computer program code are configured to, with the at least one processor, cause the edge device to at least:
    monitor traffic of a communication network, for request packets and response packets;
    generate a first traffic record indicative of respective measures of the request packets exiting the communication network via the edge device for respective data flows and a second traffic record indicative of respective measures of the response packets entering the communication network via the edge device for respective data flows; and
    send the first traffic record and the second traffic record from the edge device toward a controller,
    wherein the first traffic record comprises a first reversible sketch and the second traffic record comprises a second reversible sketch.

2. The edge device according to claim 1, wherein the traffic is monitored using flow-level monitoring.

3. The edge device according to claim 1, wherein the first traffic record is keyed based on destination address information and the second traffic record is keyed based on source address information.

4. The edge device according to claim 1, wherein the at least one memory and the computer program code are configured to, with the at least one processor, cause the edge device to at least:
    receive, from the controller, an instruction to control traffic of one of the data flows identified as having a traffic anomaly associated therewith; and
    control the traffic of the one of the data flows identified as having the traffic anomaly associated therewith.

5. The edge device according to claim 1, wherein the at least one memory and the computer program code are configured to, with the at least one processor, cause the edge device to at least:
    receive, from the controller, an instruction to stop controlling traffic of the one of the data flows identified as having the traffic anomaly associated therewith; and
    stop controlling the traffic of the one of the data flows identified as having the traffic anomaly associated therewith.

6. A method, comprising:
    monitoring traffic, at an edge device of a communication network, for request packets and response packets;
    generating, by the edge device, a first traffic record indicative of respective measures of the request packets exiting the communication network via the edge device for respective data flows and a second traffic record indicative of respective measures of the response packets entering the communication network via the edge device for respective data flows; and
    sending the first traffic record and the second traffic record from the edge device toward a controller,
    wherein the first traffic record comprises a first reversible sketch and the second traffic record comprises a second reversible sketch.

7. A communications controller ("controller") comprising:
    at least one processor; and
    at least one memory including computer program code;
    wherein the at least one memory and the computer program code are configured to, with the at least one processor, cause the controller to at least:
    receive, from each communication network edge device in a set of communication network edge devices ('edge devices'), a respective set of network traffic information comprising a first traffic record indicative of respective measures of request packets exiting the communication network via the respective edge device for respective data flows and a second traffic record indicative of respective measures of response packets entering the communication network via the respective edge device for respective data flows, wherein the first traffic record comprises a first reversible sketch and the second traffic record comprises a second reversible sketch; and
    determine, based on the sets of network traffic information of the edge devices, whether a traffic anomaly indicative of an attack on the communication network is detected.

8. The controller according to claim 7, wherein the first traffic record is keyed based on destination address information and the second traffic record is keyed based on source address information.

9. The controller according to claim 7, wherein the respective measures of request packets sent by the respective edge device for the respective data flows and the respective measures of response packets received by the respective edge device for the respective data flows comprise flow size information.

10. The controller according to claim 7, wherein, to determine whether a traffic anomaly indicative of an attack on the communication network is detected, the at least one memory and the computer program code are configured to, with the at least one processor, cause the controller to at least:

aggregate the first traffic records of the edge devices and the second traffic records of the edge devices to form thereby an aggregated traffic record; and determine, based on the aggregated traffic record, whether a traffic anomaly indicative of an attack on the communication network is detected.

11. The controller according to claim 7, wherein, to aggregate the first traffic records of the edge devices and the second traffic records of the edge devices to form the aggregated traffic record, the at least one memory and the computer program code are configured to, with the at least one processor, cause the controller to at least:

aggregate the first traffic records of the edge devices and the second traffic records of the edge devices in a manner for cancelling the respective measures of request packets exiting the communication network via the respective edge devices for respective data flows and the respective measures of response packets entering the communication network via the respective edge devices for respective data flows.

12. The controller according to claim 7, wherein, to aggregate the first traffic records of the edge devices and the second traffic records of the edge devices to form the aggregated traffic record, the at least one memory and the computer program code are configured to, with the at least one processor, cause the controller to at least:

apply a first set of weights to values of the first traffic records of the edge devices to provide respective weighted first traffic records;

apply a second set of weights to values of the second traffic records of the edge devices to provide respective weighted second traffic records; and aggregate the weighted first traffic records of the edge devices and the weighted second traffic records of the edge devices to form thereby the aggregated traffic record.

13. The controller according to claim 7, wherein, to determine whether a traffic anomaly indicative of an attack on the communication network is detected based on the aggregated traffic record, the at least one memory and the computer program code are configured to, with the at least one processor, cause the controller to at least:

determine, for each of a plurality of keys of the aggregated traffic record, whether a value associated with the respective key satisfies a threshold.

14. The controller according to claim 7, wherein, to determine whether a traffic anomaly indicative of an attack on the communication network is detected based on the aggregated traffic record, the at least one memory and the computer program code are configured to, with the at least one processor, cause the controller to at least:

generate, based on the aggregated traffic record, a list of anomalous keys comprising keys of the aggregated traffic record for which respective values satisfy a threshold; and determine, from the list of anomalous keys, whether any of the anomalous keys are included in the list of anomalous keys at least a threshold number of times.

15. The controller according to claim 7, wherein the at least one memory and the computer program code are configured to, with the at least one processor, cause the controller to at least:

initiate, in response to a determination that a traffic anomaly indicative of an attack on the communication network is detected for a data flow, attack mitigation for the data flow.

16. The controller according to claim 15, wherein, to initiate attack mitigation for the data flow, the at least one memory and the computer program code are configured to, with the at least one processor, cause the controller to at least:

determine, based on the aggregated traffic record, an identity of a reflector associated with the traffic anomaly indicative of the attack on the communication network; and initiate attack mitigation for the data flow based on the identity of the reflector associated with the traffic anomaly indicative of the attack on the communication network.

17. The controller according to claim 15, wherein, to initiate attack mitigation for the data flow, the at least one memory and the computer program code are configured to, with the at least one processor, cause the controller to at least:

send, toward one of the edge devices, an instruction for the one of the edge devices to control traffic of the data flow.

18. The controller according to claim 15, wherein the at least one memory and the computer program code are configured to, with the at least one processor, cause the controller to at least:

determine, based on new sets of network traffic information of the edge devices, that the data flow no longer has the traffic anomaly indicative of the attack on the communication network associated therewith; and initiate, in response to the determination that the data flow no longer has the traffic anomaly indicative of the attack on the communication network associated therewith, removal of attack mitigation for the data flow.

* * * * *